United States Patent
Chancellor

[19]

[11] Patent Number: 6,149,393
[45] Date of Patent: Nov. 21, 2000

[54] AIR LIFT PUMP

[75] Inventor: Dennis Chancellor, Camarillo, Calif.

[73] Assignee: Nate International

[21] Appl. No.: 09/014,238

[22] Filed: Jan. 27, 1998

Related U.S. Application Data

[60] Provisional application No. 60/036,739, Jan. 27, 1997, and provisional application No. 60/036,740, Jan. 27, 1997.

[51] Int. Cl.$^7$ ..................................................... F04B 19/24
[52] U.S. Cl. ............................ 417/53; 417/391; 417/409; 417/423.1
[58] Field of Search ........................ 417/53, 391, 423.1, 417/423.3, 408, 409, 313, 424.2

[56] References Cited

U.S. PATENT DOCUMENTS

| | | | |
|---|---|---|---|
| 4,455,232 | 6/1984 | Reid | 210/628 |
| 5,944,999 | 8/1999 | Chancellor et al. | 210/650 |

*Primary Examiner*—Charles G. Freay
*Assistant Examiner*—Cheryl J. Tyler
*Attorney, Agent, or Firm*—Fish and Associates, LLP

[57] ABSTRACT

A combination of an air lift pump and a mechanical pump is used to lift a fluid from a lower level to a higher level. In preferred embodiments compressed air is released below the level of a submerged mechanical pump having an impeller, such that the compressed air impinges upon the low pressure side of the impeller. The combination may be used advantageously in conjunction with a semipermeable membrane disposed within a deep channel to lift a purified fluid.

17 Claims, 3 Drawing Sheets

AIR LIFT PUMP

This application claims priority to U.S. patent application Nos. 60/036,740 and 60/036,739, both filed Jan. 27, 1997.

FIELD OF THE INVENTION

The present invention relates generally to air lift pumps.

BACKGROUND OF THE INVENTION

Air lift pumps are well-known devices for raising a liquid from a depth, and are advantageous in many circumstances over conventional, positive pressure pumps. One advantage is cost effectiveness, due to extreme simplicity in design. Another advantage is improved reliability air lift pumps have few or no moving parts to wear out, and are particularly well suited for moving brine or other corrosive liquids.

Air lift pumps are not, however, always suitable for a given task. Known air lift pumps may, for example, be inefficient or inadequate to move large volumes of liquid. Air lift pumps may also be problematic in that the compression equipment need to provide the compressed gas is generally located above-ground, which may create undesirable noise.

Thus, there is a continued need for methods and apparatus which improve the utility of air lift pumps.

SUMMARY OF THE INVENTION

The present invention is directed to methods and apparatus in which a submerged release of a compressed gas and a mechanical pump cooperate to raise a fluid from a lower level to a higher level. In a preferred class of embodiments, the compressed gas operates a pneumatic pump, and at least some of the exhaust of the pump is released into the low pressure side of the pump's impeller(s). In a particularly preferred class of embodiments, the combination may be used advantageously in conjunction with a semipermeable membrane disposed within a deep channel, or in some other manner operatively coupled to a pressurized fluid.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
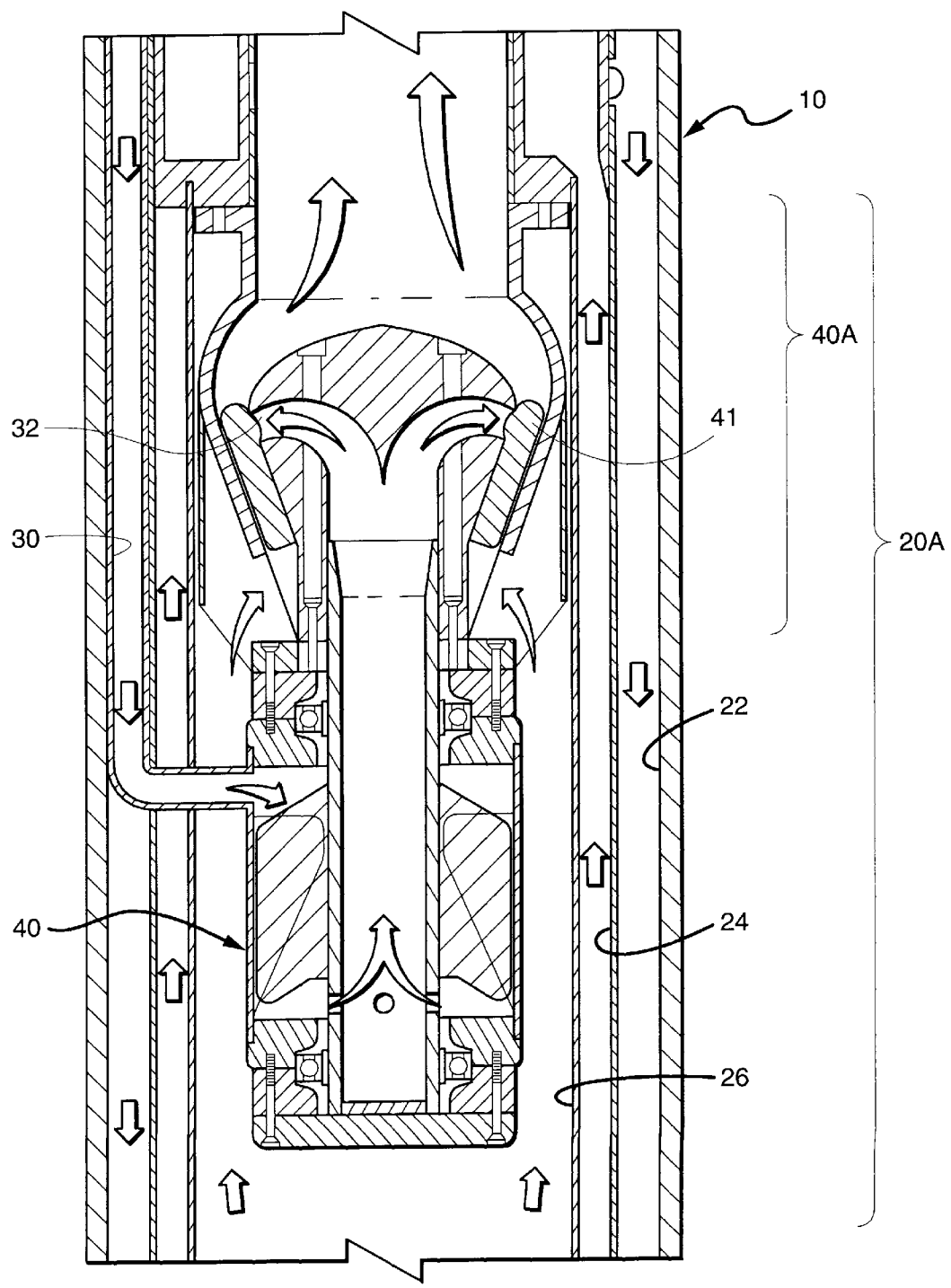
FIG. 1 is a vertical section of a pumping stage of a channel based membrane purification system.

In FIG. 1 a well 10 contains a membrane purification system for purifying feedwater. The system includes at least one pumping stage 20, at least one transition stage (not shown) which serve to connect the pumping stage 20 to the surface (not shown), and at least one membrane stage (not shown), generally disposed below the pumping stage 20, which contain membranes for effecting the purification. The pumping stage 20 generally comprises a feedwater passageway 22, a brine discharge passageway 24, a permeate passageway 26, a compressed gas passageway 30, a gas discharge port 32 and a pneumatic pump 40. Additional details of preferred embodiments are provided in co-pending U.S. patent application Ser. No. 08/925055 which is incorporated herein by reference, and co-pending PCT application serial no. PCT/US97/15181, tie U.S. national phase filing of which is incorporated herein by reference.

Compressed gas for the compressed gas passageway 30 is generally contemplated to be provided by a compressor at or near the surface. Suitable compressors are known in the art and may be those contemplated in U.S. Pat. No. 4,135,364 to Busick (Jan. 1979) and U.S. Pat. No. 4,355,513 to Girden (Oct. 26, 1982). Alternatively, however, compressed gas can be provided in situ by electrolysis or other means. The term "compressed gas" is used herein in a generic sense to include any compressed gas or combination of gases, including compressed air. Similarly, the word "air" as in the term "air lift pump" and in other terms herein is also used herein in a generic sense to include any compressed gas or combination of gases. It is contemplated, for example, that chlorine or other gas or mixture of gases can be employed in the subject matter to act as an antibacterial or other purifying agent.

The compressed air passageway 30 can be formed of any suitable material contemplated to withstand normal operating conditions. At least in some portion of the system, the compressed gas passageway 30 may comprise either a separate conduit, or a pathway formed with other pathways within a larger housing.

The gas discharge port 32 may comprise a single outlet, or multiple outlets. In FIG. 1, there is only one gas discharge outlet 32, although in alternative embodiments a plurality of outlets may be provided at the same depth or at different depths from each other. In preferred embodiments, however, it is contemplated that at least one of the outlets will release the compressed gas such that the released gas will flow upwards through the mechanical pump 40. It will be appreciated that in the embodiment of FIG. 1, the pump 40 is a pneumatic pump, and that the pressure of the compressed gas is used to operate the pump 40. In addition, the gas exhausted by the pneumatic pump is released under the impeller 41. Computer modeling predicts that such an arrangement will provide an increase in energy efficiency of up to 3.5%, and will also extend the life span of the mechanical pump.

Pump 40 is generally contemplated to comprise a positive pressure pump, the category of which includes centrifugal and axial flow pumps. Suitable pumps are known in the art, and generally have at least one impeller past which both pumped fluid and a gas can pass. It is contemplated that the mechanical pump(s) may be powered pneumatically (as in FIG. 1), by electricity (as in FIG. 2), by shaft power from the surface, or by any other suitable means. While other embodiments are contemplated, it is expected that a preferred pump for a channel based reverse osmosis system will run at about 3600 RPM in a 23 inch diameter casing, and that at a depth of about 1800 feet, the compressed gas will be released from a pressure of about 350–400 psi.

Those skilled in the art of mechanical pumps will understand that the impeller of pump 40 can be designed to develop sufficient vacuum on the low pressure side of the impeller fan(s) or blade(s) to vaporize a portion of the liquid being pumped. This is presently considered to be a desirable effect, in that the rising gas produced by vaporizing the liquid will reduce the head pressure above the pump, and thereby increase power efficiency.

The type of impeller and impeller blade(s) employed may also be selected to take advantage of heat effects. In pumping relatively cold liquids such as underground oils, for example, it may be advantageous to utilize impeller blades which tend to heat the oil. Such heating is contemplated to lower the viscosity of the oil and reduce the overall energy requirements for pumping.

The addition of gas to the liquid being pumped can have numerous salutary effects. As noted above, chlorine or other gas can be added as an antibacterial agent. Even ordinary atmospheric air can have a salutary effect by reducing the pH from a value of about 5, which is common for reverse osmosis permeate, to a value of about 7. Similarly, intermixing of ordinary atmospheric air with the fluid being pumped can improve the aeration of water or other fluid, or, for example, the viscosity of an oil being pumped.

Figure 2:
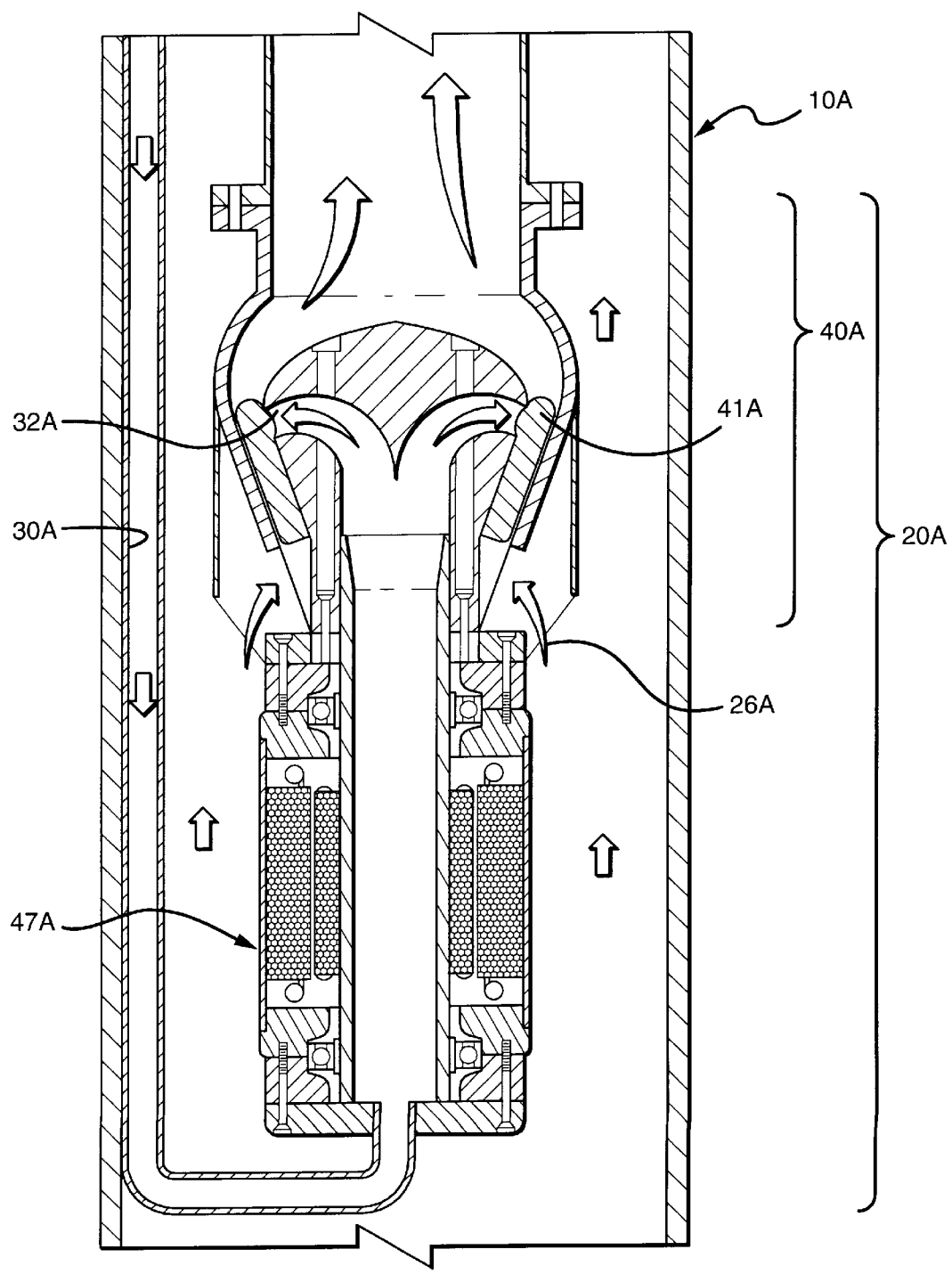
FIG. 2 is a vertical section of an alternative pumping stage of a channel based membrane purification system.

In FIG. 2, an air lift system is provided which does not necessarily employ compressed air at all. In this case a well 10A contains a membrane purification system for purifying salty, briny or other feed water. The system includes at least one pumping stage 20A, at least one transition stage (not shown) which serve to connect the pumping stage 20A to the surface (not shown), and at least one membrane stage (not shown), generally disposed below the pumping stage 20A, which contain membranes for effecting the purification. The pumping stage 20A generally comprises a permeate passageway 26A, a gas passageway 30A, a gas discharge port 32A and a pump 40A driven by electrical motor 47A. Operation of pump 40A creates a vacuum under the impeller 41A, which draws air or other gas through gas passageway 30A, and thence upwards along with the pumped permeate.

Figure 3:
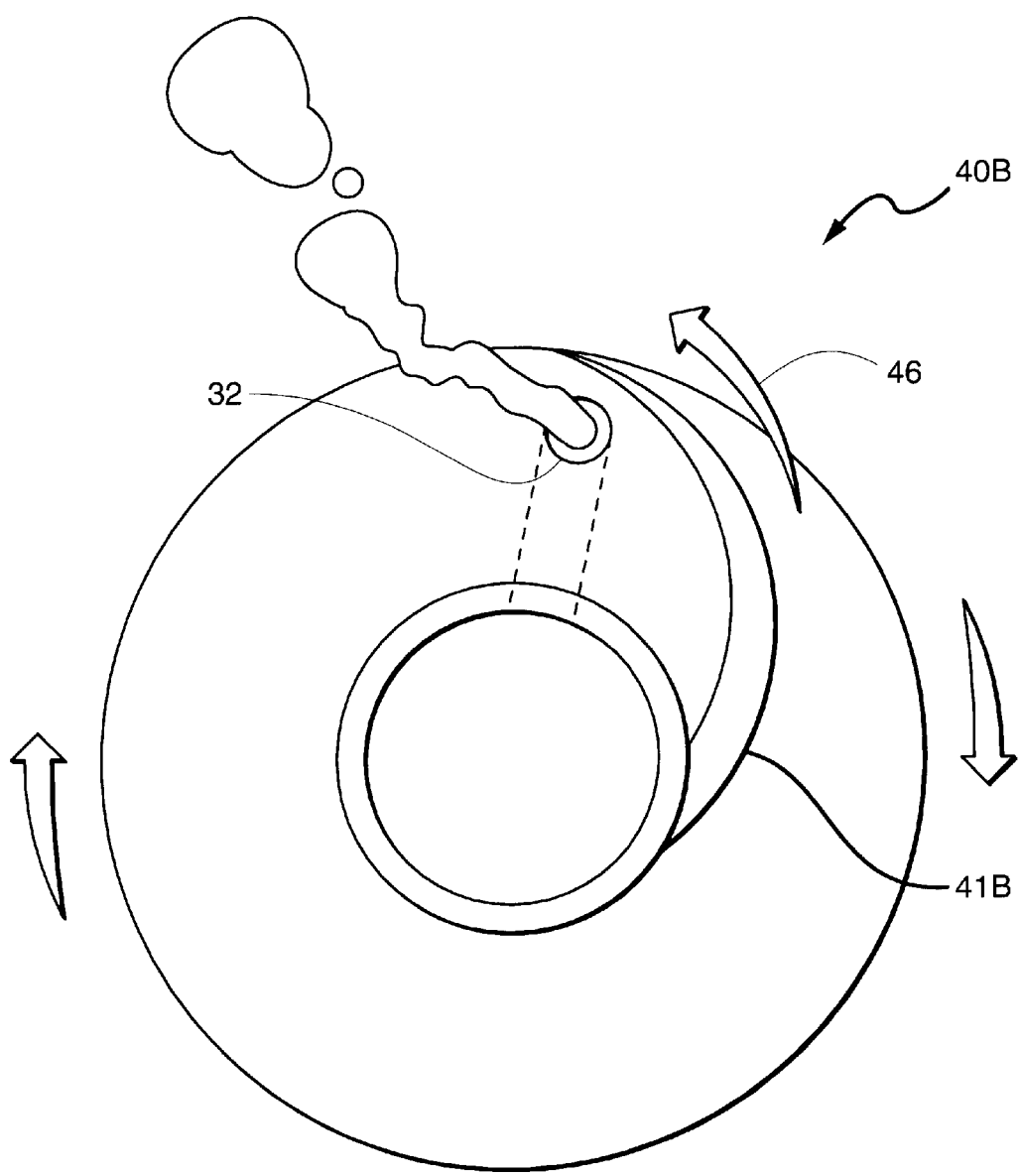
FIG. 3 is a horizontal section of a pneumatic pump having a single impeller fin.

In FIG. 3, a pump 40B (which may comprise a pneumatic, electric or other pump) has an impeller with a single fin 42B. In the drawing fin 42B rotates clockwise, which has the effect of forcing fluid radially in the direction of arrow 46. Gas, which may or may not be compressed, is provided behind, i.e., on the low pressure side of the fin 42B, which serves to increase the efficiency of the pump, and also reduces wear on the impeller. Of course, pumps with different types and numbers of impellers and fins are also contemplated, specifically including all manner of suitable disk impellers, centrifugal impellers, axial impellers and turbine type impellers.

Thus, specific embodiments and applications of an improved air lift pump have been disclosed. It should be apparent, however, to those skilled in the art that many more modifications besides those already described are possible without departing from the inventive concepts herein. Therefore, the inventive subject matter is not to be restricted except in the spirit of the appended claims.

What is claimed is:

1. A method of pumping a fluid from a lower level to a higher level, comprising:

causing the fluid to enter a channel;

providing a mechanical pump in fluid communication with the fluid;

operating the mechanical pump to pump the fluid towards the higher level;

causing a gas to flow into the channel in a manner which assists in pumping the fluid towards the higher level; and releasing a compressed gas such that at least a portion of the compressed gas passes through the mechanical pump.

2. The method of claim 1 further comprising:

causing the fluid to enter the channel as a feed fluid;

passing the feed fluid through a filter to produce a filtered fluid; and causing the mechanical pump and the gas to cooperate in pumping the filtered fluid towards the higher level.

3. The method of claim 2 further comprising providing the filter as a semipermeable membrane.

4. The method of claim 2 further comprising utilizing a head pressure of the fluid to drive the feed fluid across a semipermeable membrane.

5. The method of claim 1 wherein the step of providing a mechanical pump comprises providing a centrifugal pump.

6. The method of claim 1 wherein the step of providing a mechanical pump comprises providing an axial flow pump.

7. The method of claim 1 further comprising submerging the mechanical pump in the fluid.

8. The method of claim 1 wherein the step of operating the mechanical pump and the step of causing the gas to flow into the channel occur substantially continuously.

9. The method of claim 1 wherein the step of causing the compressed gas to flow into the channel comprises pumping compressed gas into the channel.

10. The method of claim 1 wherein the step of providing a mechanical pump comprises providing at least one impeller fin in fluid communication with the fluid, and forcibly rotating the impeller to pump the fluid towards the higher level.

11. The method of claim 1 wherein the step of providing a mechanical pump comprises providing at least one impeller in fluid communication with the fluid, and forcibly rotating the impeller to pump the fluid towards the higher level, and further comprising utilizing a head pressure of the fluid to drive the fluid across a semipermeable membrane.

12. The method of claim 9 wherein the step of providing a mechanical pump comprises providing at least one of a disk pump, a centrifugal pump, an axial flow pump and a turbine.

13. The method of any of claims 1–12 wherein the step of pumping the fluid towards the higher level assists at least in part in producing a rising fluid, and further comprising recovering usable energy from the rising fluid.

14. The method of any of claims 1–12 wherein the step of causing a gas to flow into the channel comprises providing the gas a mixture of air and at least one other substance.

15. The method of any of claims 1–12 wherein the step of causing a gas to flow into the channel to assist in pumping the fluid comprises allowing the gas to rise upwards in the channel to reduce a head pressure on the mechanical pump.

16. The method of any of claims 1–12 further comprising using the pump to heat the fluid.

17. The method of any of claims 1–12 further comprising using the gas to aerate the fluid.

* * * * *